No. 764,262. PATENTED JULY 5, 1904.
O. C. ST. CLAIR.
COMMERCIAL INSTRUMENT AND BOOK.
APPLICATION FILED JAN. 26, 1903.

NO MODEL. 2 SHEETS—SHEET 1.

No. 764,262. PATENTED JULY 5, 1904.
O. C. ST. CLAIR.
COMMERCIAL INSTRUMENT AND BOOK.
APPLICATION FILED JAN. 26, 1903.
NO MODEL. 2 SHEETS—SHEET 2.

Witnesses.
Samuel W. Banning.
Walker Banning.

Inventor.
Oscar C. St. Clair.
By Banning & Banning,
Att'ys.

No. 764,262.

Patented July 5, 1904.

UNITED STATES PATENT OFFICE.

OSCAR C. ST. CLAIR, OF CHICAGO, ILLINOIS.

COMMERCIAL INSTRUMENT AND BOOK.

SPECIFICATION forming part of Letters Patent No. 764,262, dated July 5, 1904.

Application filed January 26, 1903. Serial No. 140,557. (No model.)

*To all whom it may concern:*

Be it known that I, OSCAR C. ST. CLAIR, a citizen of the United States, residing at Chicago, in the county of Cook and State of Illinois, have invented certain new and useful Improvements in Negotiable Instruments and Books, of which the following is a specification.

This invention relates to commercial instruments of limited negotiability having a body on the face of which is printed a form of negotiable instrument and in addition thereto a clause explicitly stating the fact that there is a sufficiency of funds on hand to meet the instrument when presented for payment and having at one end a stub having therein a clause or clauses indicating the special or limited use for which the instrument is intended; and the invention further relates to a book made up of instruments having the form and characteristics above named and having bound therein an identifying form of instrument for the signature of the user, a balance-sheet, and a sheet containing the names of those who will accept the instrument in trade or otherwise.

The objects of the invention are to identify the instruments for the special line of use for which they are primarily limited or intended, to insure safety against the forgery of the name of the drawer of the instrument, to furnish on the face of the instrument a statement executed by the drawer in signing his name to the instrument to the effect that the drawer has sufficient funds to meet the amount for which the instrument is drawn, to embody with a book of the instruments a balance-sheet from which the balance due the drawer of the instrument can be readily ascertained by comparison of the deposits with the amounts drawn out, and to notify those desiring to use the instruments for trade where and by whom the instruments will be accepted.

The invention consists in the features of construction and combinations of parts hereinafter described and claimed.

Figure 4:
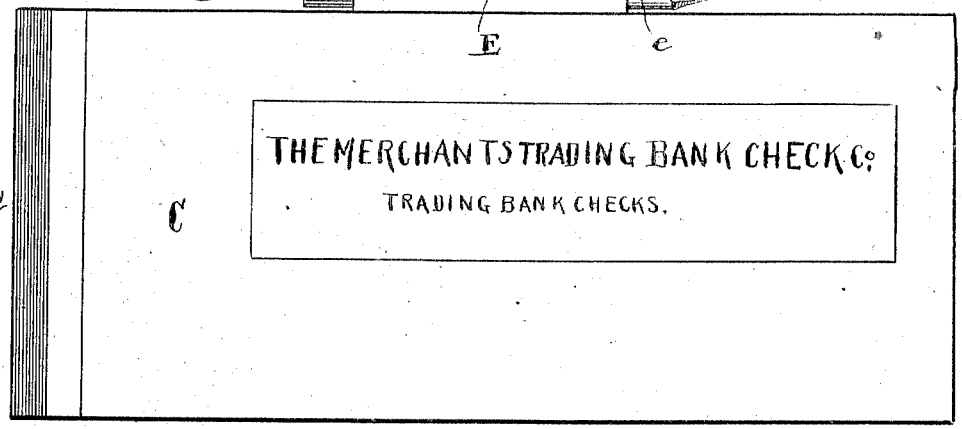
Figure 5:
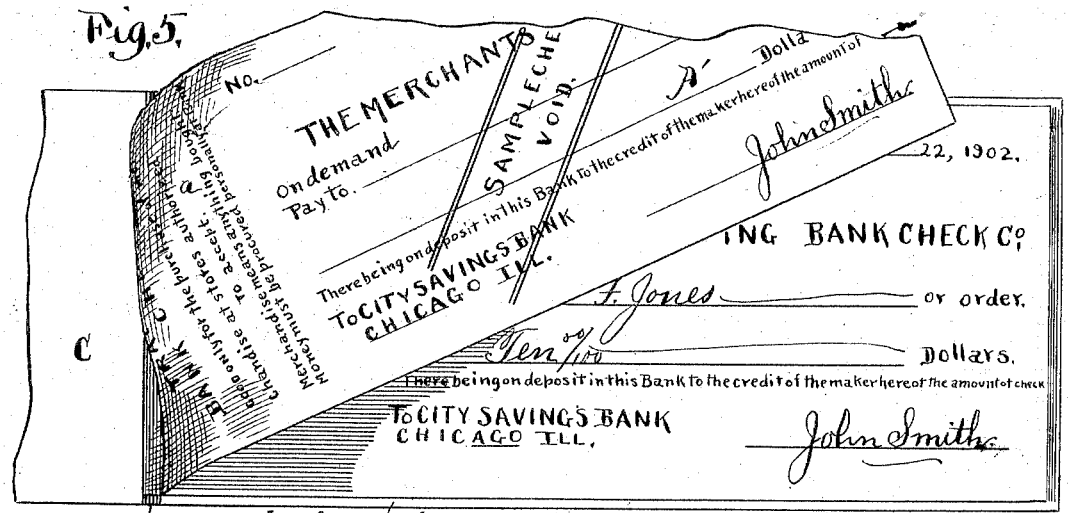
Figure 6:
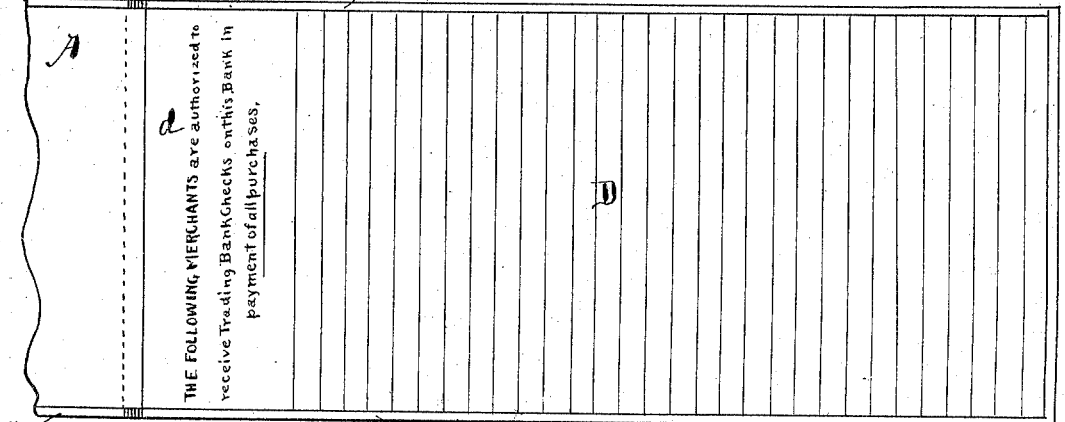

In the drawings, Figure 1 is a face view of the blank in one form of arrangement for the instruments of the invention; Fig. 2, a view of a book containing the instruments with the top cover open and broken away and showing a sample form of the instruments for identification of the signature of the person having the right to fill in and sign the instruments contained in the book; Fig. 3, a similar view to Fig. 2 with the identifying instrument turned back, showing a form of balance-sheet; Fig. 4, a view of the book with the top cover closed and showing on the top cover a holder or clasp for containing a pen or pencil; Fig. 5, a similar view to Fig. 2 with the identifying instrument in position for comparing the signature thereon with the signature of a filled instrument, and Fig. 6 a view of the book open and the top cover and instruments broken off and showing a blank for the names of parties who will accept the instruments in trade or otherwise.

The limited negotiable instrument of the invention can be in the general form of a draft, bank-check, order, or other accepted forms of negotiable instruments. The face of the body of the instrument has printed thereon the name of the company, bank, or party issuing the same, with a regular form of negotiable instrument such as is ordinarily used, the form illustrated being that of a draft. The body of the instrument, below the line for the amount for which it is drawn and above the signature of the drawer, has printed thereon a statement to the effect that the drawer has sufficient funds in the bank to meet the instrument, thereby rendering him personally responsible to the drawee for the amount thereof. The statement can be in the form indicated by the words "there bring on deposit in this bank to the credit of the maker hereof the amount of this check" or other suitable words or phrases constituting a liability which would make the drawer subject to a prosecution for false pretenses in giving the instrument if the statement therein contained be not true. The blank A, as shown, has at one end a stub or extension *a*, on which is to be printed words indicating the nature of the instrument and the special use or uses for which it can be employed. As shown, the stub or extension has thereon the words "Trading bank-check," indicating that the check is usable or transferable in trade; but other words could be employed of a nature to indicate the use for which the instrument is specially intended. The stub or extension $a$, as shown, also has thereon the words "good only for the purchase of merchandise at stores authorized to accept," by which notification is given that the negotiable instrument is specially intended for the purchase of merchandise at designated stores and that such stores will accept the instrument in the course of trade for the face value thereof, as indicated by the amount filled in. At one corner in the form of negotiable instrument shown the name of the bank or other institution that will accept the same is printed, which would be the case where the instrument was in the form of a check or draft.

As shown in Figs. 1 and 2, the instrument is intended for use only at stores authorized to accept the same, which clause tends to limit the negotiability of the instrument to a certain designated class. The instrument may be further limited by a clause stating that the money must be procured personally at the bank by the party in whose favor the instrument is drawn, thereby enabling the bank to deal with such party on terms previously agreed between the parties.

The instrument can be bound into a book containing twenty-five instruments, more or less, and when so bound it is preferred to have an initial or first instrument $A'$ of the blank form used which will serve as an identifying means for the signature of the drawer who properly signs the same, and this initial or identifying instrument $A'$ is to be marked with the words "Sample check void" or other words of like signification, rendering this instrument void and serving simply as a means for identifying the signature. The book in the arrangement shown has bound between the initial or identifying instrument $A'$ and the first usable instrument $A$ a balance-sheet $B$, which, as shown, has its body divided by longitudinal lines into columns for the date and amount, one of the columns, $b$, showing the deposits and the other column, $b'$, showing the checks or withdrawals, and, as shown, the body of the blank is divided into spaces corresponding in number to the number of checks in the book for ease of obtaining knowledge as to the condition of the deposits and the checks or withdrawals. The balance-sheet shown has twenty-five spaces, numbered consecutively from "1" to "25," both inclusive; but a greater or less number of spaces may be provided, the spaces being consecutively numbered. The book for a twenty-five-space balance-sheet should contain twenty-five instruments, and these instruments may be consecutively numbered to correspond with the numbers of the spaces of the balance-sheet.

The party to whom a filled instrument for a given amount is presented can by turning to the balance-sheet and comparing the entries for the deposits—the entries for the checks removed from the book, if all the checks are entered in the check or withdrawal column—easily determine whether the deposit is sufficient to cover the amount for which the instrument is drawn by the party purchasing goods or other commodities, thus putting into the hands of the receiver of the instrument by the book itself the means for determining whether there is sufficient funds on deposit as entered on the balance-sheet by the bank or other depository of the funds of the maker of the instrument to meet the amount of the drawn instrument. The balance-sheet at one end has a stub or extension $b^2$, on which can be printed in any suitable form notices and warnings of any character desired. The number of blank leaves required for the book are bound between a top cover $C$ and a bottom cover $C'$ and held in place by a suitable binding $c$, joining the covers and holding the leaves or blanks of the book in place, and the size of the book may be one for convenience in carrying in the pocket of the user. The inner face of the back cover $C'$ of the book has affixed thereto a blank $D$, the body of which has thereon transverse lines for names, and, as shown, the blank $D$ has at one end a stub or extension $d$, on which can be printed a notice in suitable form and words indicating that the names on the body of the blank are those who will receive the instruments in payment for purchases of merchandise or otherwise, thus giving to the owner or user of the book the necessary information and data as to who will accept the instruments in payment of merchandise or otherwise. The top cover at one side edge in the arrangement shown has thereon a retainer or clasp $E$ for holding a pencil or pen for use in filling in and signing the negotiable instruments, making it possible for the user or drawer of the negotiable instruments to have always at hand the means for filling in and signing, which in many cases is very desirable.

The limited negotiable instrument of this invention, whether in the shape of a draft, check, order, or other form, with an indicating end or extension as to the nature and use of the instrument, will be found very convenient and applicable for use in trading or buying for those who do not care to use money for such purposes, as the instrument takes the place of and has the same value for trading or buying purposes as the money. It carries on its face a statement signed by the drawer or giver thereof that it is good for the amount for which it is drawn, which statement signed by the drawer renders him fully liable for issuing the instrument, and the instrument has thereon a notification to the effect that it is transferable in the purchase of merchandise, but if money is desired thereon the same must be personally procured at the bank, company, office, or other institution at which it is made payable.

The bound book of instruments of the character of the invention carries with it a form instrument which is rendered non-negotiable and from which the signature of the drawer can be identified. The book also has bound therein a balance-sheet for the deposits and withdrawals to be kept by the bank or other depository paying the instruments showing the status of the account, so that with the identification-blank and the balance-sheet it is practically impossible to forge or draw an instrument for a greater amount than the balance due on deposits, as the receiver of the drawn instrument has the means at hand both for identifying the signature and disclosing the status of the account, which features are very desirable in books of the character to which the invention relates, and the book for use in trading or dealing has bound therein a blank containing the names of those who will receive the instruments when properly filled in and signed in payment for merchandise or otherwise.

The instruments and the book will be found valuable adjuncts for trading generally and for other purposes where a safe limited negotiable instrument is required and necessary.

What I regard as new, and desire to secure by Letters Patent, is—

1. In a book of commercial instruments of limited negotiability, the combination of a canceled initial or identifying instrument and a series of usable instruments each consisting of a body having printed on its face a negotiable-instrument form including a designating-notice as to the depository, where payable, and above the signature-line a statement in the form of an undertaking that the maker or drawer has a sufficiency of funds deposited to meet the instrument, and a space at one end of and integral with the body and having printed thereon a limiting clause indicatory of the nature of the instrument and of the particular business for which the same is intended, substantially as described.

2. In a book of commercial instruments of limited negotiability, the combination of a canceled initial or identifying instrument, a balance-sheet having a special column for deposits and a special column for withdrawals, each space having the numbers consecutively following each other, a series of instruments consecutively numbered to correspond with the numbered spaces, the identifying instrument and each of the usable instruments having on the face of its body a payment-form, a notice as to depository where payable, and a statement in the form of an undertaking that there are funds on deposit to meet the amount to be paid and having on one end of its face a limiting clause indicatory of the nature of the instrument, of the persons authorized to receive the same in payment, and a blank sheet for containing the names of such authorized parties, substantially as described.

OSCAR C. ST. CLAIR.

Witnesses:
OSCAR W. BOND,
SAMUEL W. BANNING.